Patented Sept. 8, 1953

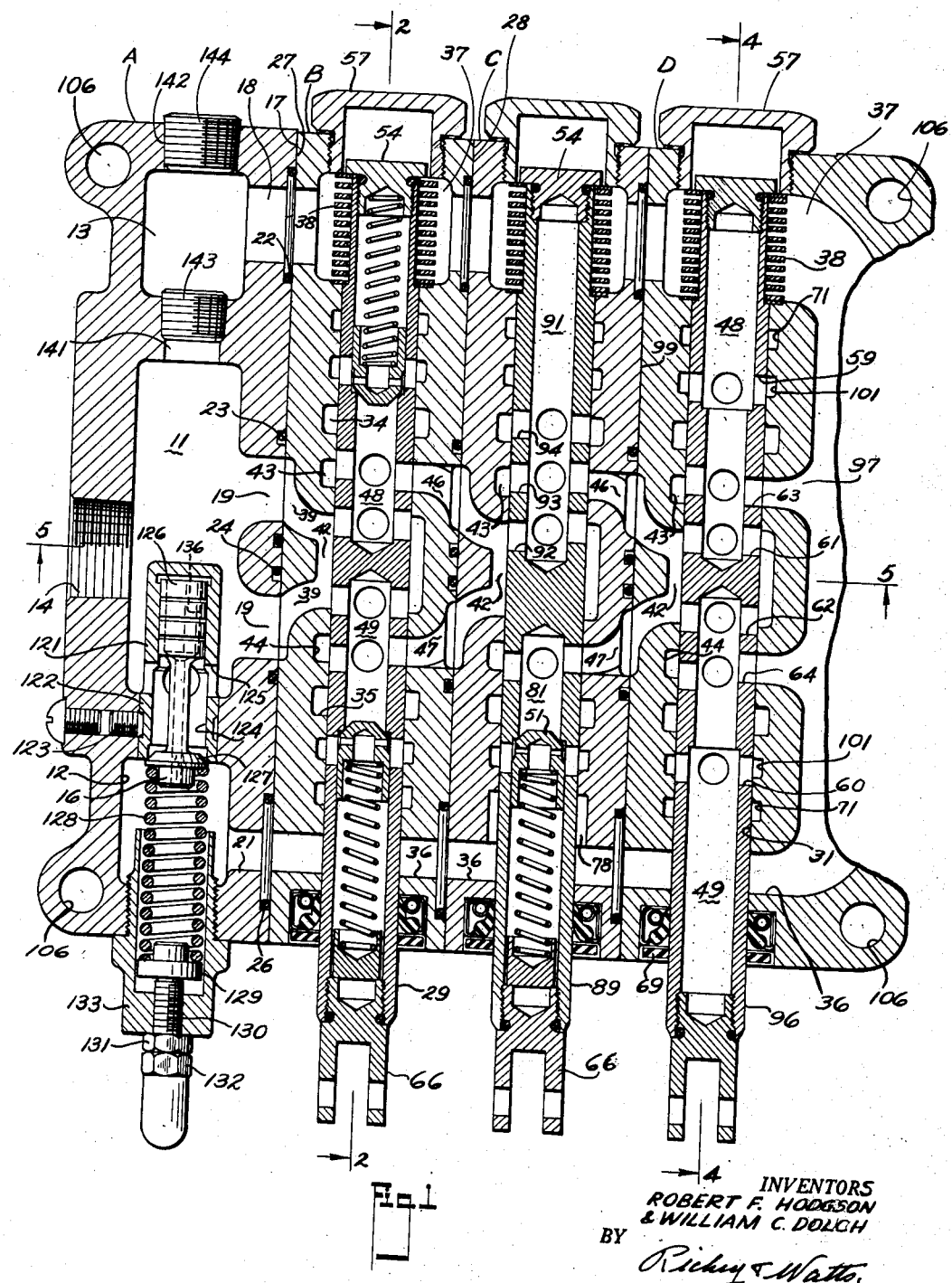

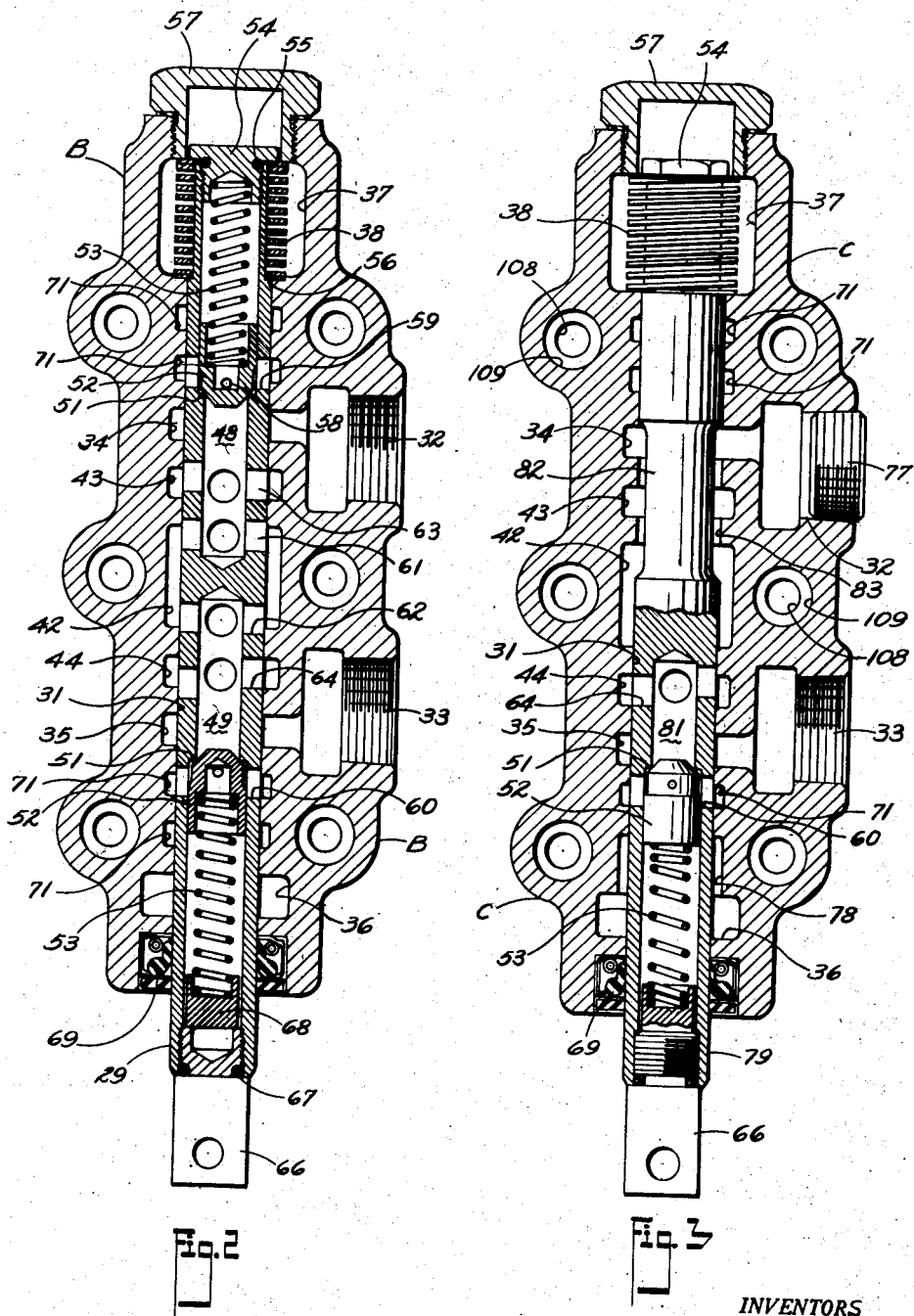

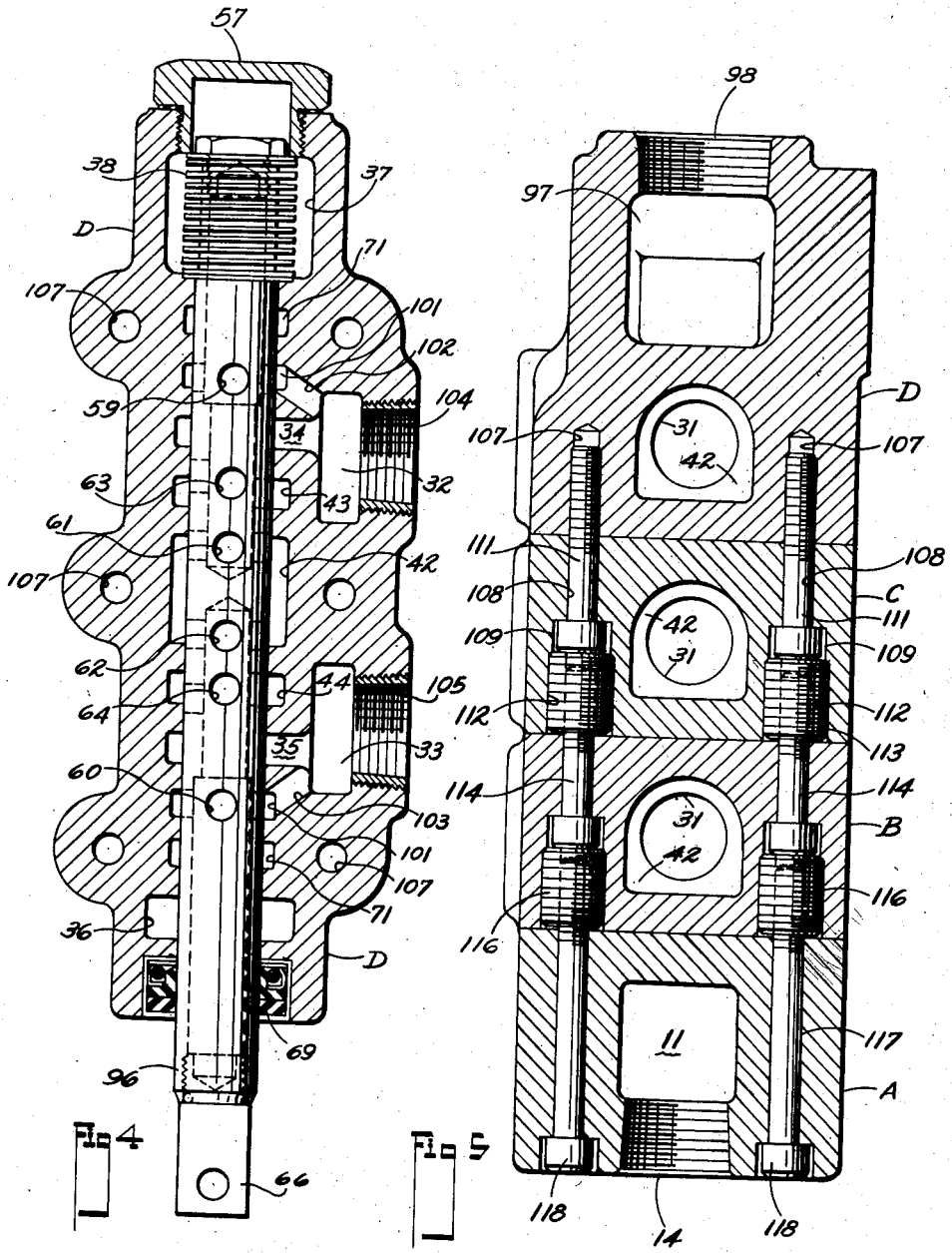

2,651,324

UNITED STATES PATENT OFFICE 2,651,324

MULTIPLE CONTROL VALVE

Robert F. Hodgson, Chagrin Falls, and William C. Dolch, Willoughby, Ohio, assignors, by mesne assignments, to The New York Air Brake Company, New York, N. Y., a corporation of New Jersey Application November 1, 1949, Serial No. 124,806

16 Claims. (Cl. 137—621)

This invention relates to hydraulic power systems and more particularly to valves for controlling the flow of fluid in such systems.

As is well known, many hydraulic power systems include the following basic elements: a fluid reservoir; a pump to deliver fluid from the reservoir under pressure; a relief valve to protect the pump against overloads; one or more motors, which in many cases are single-acting or double-acting cylinders; and valve mechanism, usually manually controlled, by which the hydraulic fluid is directed from the pump to the motors and from the motors back to the reservoir, to actuate the motors in one direction or the other.

Such systems find important fields of application in the actuation of machine tools, lift trucks, earth moving and road building machinery, and many other types of machines. In such applications, there are usually a number of elements of the machine which are to be actuated hydraulically, and therefore there are many systems in use in which a number of motors are operated from a common pump under the control of valves individual to the cylinders.

The valves are, in many cases, housed together at a single point for the convenience of the machine operator. Since the requirements of diverse installations vary with respect to the number of motors to be controlled, as to whether the motors are single-acting or double-acting, and as to the nature of the control required in such respects as the need to hold the fluid in the cylinder in the neutral position of the valve or the need to float the cylinder when the valve is in neutral position, many different combinations of valves are required.

This invention relates primarily to valves for plural motor systems. A feature of the invention lies in the fact that the multiple valves are made up of individual sections or units, which are interchangeable and may be assembled together in various numbers of various types. By virtue of this, requirements of great diversity may be satisfied from a relatively small number of individual components, eliminating the necessity for providing special combinations with the attendant heavy expense of providing patterns and fixtures for the various special combinations. Moreover, a further feature of the invention in this respect lies in the fact that valves which perform different functions are but slightly different in structure so that mass production procedures may be most efficiently used. We are aware that sectional valve assemblies have been hitherto proposed, but the valves according to the invention incorporate novel and advantageous features by virtue of which the advantages of the sectional multiple valve may be effectively realized.

Multiple valve systems fall generally into one of two classes, those in which the motors are connected to the pump in parallel and those in which the motors are connected in series. Both types have known advantages and disadvantages. The principal limitations of the systems arise in connection with the operation of two or more motors at the same time, which is often highly desirable or essential in practice. With the parallel system, operation of two motors at the same time can only be effected by throttling control of the motors, since if the valves controlling two motors are open full at the same time, the more heavily loaded motor will operate in the reverse direction, discharging into the less heavily loaded motor. While this reverse flow can be prevented by a check valve arrangement, it is still necessary to divide flow between the motors by throttling the flow to the one offering less resistance to entrance of fluid.

With a series system employing double-acting cylinders, this disadvantage is obviated, since the pump drives the first cylinder in the series and the discharge from this cylinder positively drives the next in series and so on.

However, so far as we are aware, no multiple valve system employing a plurality of valves in a series circuit has been adapted to the control of single-acting cylinders, nor has any been adapted to the control of groups comprising both single and double-acting cylinders. The system of the invention not only provides for such arrangements, but provides for concurrent power actuation of double-acting cylinders either ahead of or behind the single-acting cylinder when the single-acting cylinder is being exhausted.

We believe the foregoing will be sufficient to indicate to those skilled in the art the general nature of the invention. A fuller understanding of the principles and advantages thereof may be had from the full description herein of the preferred embodiment of the invention.

The principal object of the invention is to improve the characteristics of, and controlling systems for, multiple motor hydraulic systems. A further object is the provision of a system of valves particularly adapted for arrangement in banks and by which multiple valve set-ups adapted to the control of various numbers of motors of different types and with different control possibilities may be readily obtained. An additional object of the invention is to provide an improved series circuit for hydraulic power systems, adaptable to both single-acting and double-acting motors. A still further object of the invention is to attain these objects in a system having a very high degree of engineering and economic practicality and acceptability. More specifically, an object of the invention is to provide a multiple valve system in which valves of diverse characteristics employ structural elements which embody relatively slight modifications from each other, so that the system is peculiarly well adapted to mass production with consequent economies. A further object is to utilize the advantages of the hollow plunger and check valve type of valve in a series circuit.

Other objects and advantages of the invention and the manner in which the objects are realized will be clear to those skilled in the art from the appended specification and the accompanying drawings in which:

Fig. 1 is a transverse section, taken on a plane containing the center lines of the valve plungers, of one type of multiple series valve assembly in accordance with the invention;

Fig. 2 is a view of a valve section for control of a double-acting motor, taken on the plane indicated in Fig. 1;

Fig. 3 is a sectional view of a valve unit for control of a single-acting motor, taken on a plane at right angles to Fig. 1, and illustrating an alternative form of control plunger;

Fig. 4 is a sectional view of a float position valve unit taken on the plane indicated in Fig. 1; and Fig. 5 is a sectional view of the valve assembly taken on the plane indicated in Fig. 1.

The multiple valve assemblies of the invention are provided with an inlet port for connection to a pump or other source of fluid under pressure, a discharge port for connection to a fluid reservoir, or, in general, for return of fluid to the pump, and with service ports through which the individual motors are connected to the respective control valves. Since the connections of these elements to the control valve may follow common practice in the art, it is unnecessary to the understanding of the invention to illustrate the pump, reservoir, and motors and the fluid connections between these elements and the valve assembly.

The valve assembly of Fig. 1 has been chosen as illustrative, since it includes three different types of control valves adapted to perform different control functions. It is to be understood, however, that greater or lesser numbers of these valves may be employed and that they may be employed in various combinations of types, as will be made clear.

The valve assembly in Fig. 1 comprises an inlet section A, a double-acting section B with "hold" position, a single-acting section C, and a double-acting section D with "float" position, section D including also the outlet manifold of the valve. The sections A and D are constructed with a plane inner face and the sections B and C with plane opposed faces so that the sections may be fixed together to form a rigid and fluid-tight assembly, as will be more particularly described. The inlet section A, as illustrated in Figs. 1 and 5, comprises a cast body, cored to provide an inlet chamber 11, a relief or exhaust chamber 12, and an auxiliary chamber 13. The wall of the body A is tapped as indicated at 14 to receive a high pressure fluid inlet which discharges into the chamber 11. Section A preferably houses a relief valve 16 to provide a discharge for the pump in the event of overload, although, of course, an external relief valve or a relief valve in another location could be employed. The relief valve provides a discharge from the chamber 11 into the chamber 12 upon occurrence of excessive pressure in the inlet chamber. The inner face 17 of body A is machined plane for junction to the valve section B and is formed with outlet passages 18, 19, and 21 from the chambers 13, 11, and 12, respectively, intersecting the face 17. These passages are provided with O-ring seals 22, 23, 24 and 26 fitted in counterbores or annular grooves in the face 17 to prevent escape of hydraulic fluid along the face of the valve block.

The valve sections such as B, C, and D are all so constructed as to fit against the face 17 of the inlet section A and are provided with passages coinciding with the passages in the inlet section. Similarly each of the sections B and C is provided with passages to conduct fluid to further valve units in the sequence so that these elements may be assembled in concatenation.

The valve block B (Figs. 1 and 2) is adapted for control of a double-acting motor, providing "forward," "reverse," and "hold" positions. The block or unit B is a generally rectangular casting formed with two plane surfaces 27 and 28, the former of which may be called the inlet face and the latter of which the outlet face. A cylindrical valve plunger 29 is mounted for longitudinal sliding movement in a bore 31 in the valve block. Tapped service ports 32 and 33 communicating with recesses or enlargements 34 and 35, respectively, of the valve chamber provide for connection of the section to a double-acting motor. A passage 36 joining the faces of the valve block provides a conduit for fluid discharged by the relief valve through passage 21, and for any seepage along the valve plunger. A passage 37 at the other end of the valve block, aligned with passage 18, joins the two faces, providing a conduit for seepage from the other end of the plunger. The passage 37 is enlarged to provide a chamber to receive a centering spring 38 which acts in the usual manner to bias the valve plunger toward its neutral position. The inlet face of the unit B is formed with two passages 39 registering with the outlets 19 of the inlet chamber, these passages terminating in an annular enlargement 42 of the valve bore which constitutes a high pressure inlet for the valve 29. Annular recesses 43 and 44 in the valve chamber 31 receive the discharge from the motor by way of the valve plunger, and discharge into passages 46 and 47 by which the fluid is conducted to the outlet face 28 of the unit, and thus to the next unit in the series.

When the motor is operating it receives fluid through the passages 39 and discharges through the passage 46 or 47, and when the motor is inoperative a free bypass for fluid is provided through passages 39, the valve member 29 and passages 46 and 47. The two ends of the valve plunger 29 are identical, but reversed, in the layout of ports. Likewise, the two ends of the valve casing B are mirror images of each other, with respect to the location of fluid passages. The cylindrical valve plunger 29 is formed with internal axial passages 48 and 49 which are separated at the center of the valve and which extend to the ends of the plunger. The outer portions of the passages 48 and 49 are bored out to provide shoulders 51 constituting seats for check valve members 52 slidable in the passages. The check valve members are normally urged against the seats by compression springs 53. The inner compression spring is retained in a cap 54 threaded into the end of the valve member and fitted with a seal 55. The member 54 includes a flange which projects outwardly, thus providing an abutment for the centering spring 38, the other end of which normally abuts a shoulder 56 on the valve plunger. The spring 38 also normally abuts the inner wall of the chamber 37 and the inner face of a cap 57 screwed into the end of the valve body. The check valve members 52 are formed with radial ports 58 to vent fluid from behind the valve members. The valve plunger 29 is provided with radial ports 59 and 60 outside the check valves. The plunger also has radial ports 61 and 63 from the chamber 48 registering with the chambers 42 and 43, respectively, with the plunger in neutral position. The chamber 49 is similarly provided with radial ports 62 and 64. A clevis fitting 66 or other suitable fitting by which the valve plunger may be reciprocated is threaded into the outer end of the valve plunger and fitted with the seal 67. Since the outer end of the valve plunger is desirably formed longer than the inner end, a spacer 68 is preferably fitted between the outer check valve spring 53 and the fitting 66 so that identical springs may be used for the check valves. A fluid seal and wiper 69 is fitted in a counterbore in the valve body to prevent escape of fluid along the valve plunger. The valve bore 31 is additionally recessed as indicated at 71 between the service chambers and the passages 36 and 37. The recesses 71 are not functional in this particular valve unit, but have been found advantageous in breaking what would otherwise be a long bore section without recesses and which would therefore be more more resistant to honing or other operations employed in accurately truing and sizing the valve bore. With all lands short and approximately equal, precise finishing is facilitated.

The operation of the valve section B is as follows: As shown in the drawings, this valve is in neutral position, in which pressure fluid flows from the chamber 42 into the succeeding valve section through port 61, bore 48, port 63, chamber 43, and passage 46, and by a parallel path through port 62, bore 49, port 64, chamber 44, and passage 47. The service ports 32 and 33 (Fig. 2) are blocked by the valve plunger, and therefore the motor is held against movement. If the plunger is moved upwardly, as illustrated in Fig. 2, to bring the ports 61 and 63 into registry with the chambers 43 and 34 respectively, the ports 62 and 64 into registry with the inlet chamber 42, and the ports 60 into registry with the service passage 35, the motor will be energized to operate in one direction which may be termed "forward." Hydraulic fluid then circulates from the chamber 42 through ports 62 and 64, passage 49, and ports 60, lifting the check valve, into the chamber 35 and thus to the service port 33. Return fluid from the motor enters the port 32 and proceeds through chamber 34, ports 63, passage 48, ports 61, chamber 43, and passage 46 to the outlet of the section. When the valve is moved downwardly, a reverse connection of the service ports to the inlet and outlet occurs. As will be apparent, fluid in either case is supplied to the cylinder through one or the other of the check valves which are effective to hold fluid in the cylinder in the event of stalling of the pump drive motor or other failures in the system. When the motor is operated in either direction, the bypass is closed. For example, when the valve is raised, in Fig. 2, the upper bypass is closed by movement of the ports 61 out of the chamber 42 and the lower bypass is closed by movement of ports 64 out of the chamber 44. A partial or throttling type of control may be executed by movement of the valve member to an intermediate position so as to throttle the bypass and concurrently open the passages to the service ports. The spring 38 is compressed between the shoulder 56 and the end cap 57 when the plunger is moved in one direction and compressed between the flange of the fitting 54 and the end wall of the chamber 37 when the plunger is moved in the opposite direction, and thus the spring acts to bias the valve to neutral. The radial ports in the valve plunger may be staggered to facilitate throttling of flow. In this example, the ports 63 and 64 are slightly staggered longitudinally of the plunger.

The block B is fitted with O-rings in the outlet face in the same manner as the unit A. The same is true of the succeeding units.

The valve unit C, for control of a single-acting cylinder or other motor, utilizes a body which is in most respects identical with that of unit B and, in fact, the valve unit for a double-acting cylinder may be converted into one for a single-acting cylinder by a very simple modification. The valve unit C is illustrated in Figs. 1 and 3, the body being the same in both views, but the two views illustrating alternative forms of valve plungers. Those parts of the valve casing which are duplicates of those in the double-acting unit are identified by the same reference characters, and, therefore, no extended description of this unit is required. For a single-acting motor, only one service port is required and, therefore, one may be eliminated from the body. However, as a matter of fabrication, it is believed preferable to plug one of the service ports, for example, service port 32 which is blocked by plug 77. The only other modification of the valve body lies in providing an exhaust chamber 78 communicating with the outer transverse passage 36, which chamber 78 replaces the outermost of the recesses 71 in the double-acting valve. As will be apparent, this conversion may be effected by a simple recessing operation, or by a modification of the core in casting the valve body. Considering first the plunger 79 illustrated in Fig. 3, this plunger embodies an end fitting 66, a centering spring arrangement 38, and an end plug 54 identical to those previously described. The outer end of the plunger is formed with a longitudinal bore 81 which ends short of the midpoint of the plunger and communicates with radial ports 64. The radial ports 62 of the previous form are omitted. A check valve member 52 and spring 53, as previously described, are fitted, the check valve fitting against a shoulder 51 in the passage 81. Radial ports 60 through the valve plunger on the outer side of the check valve correspond to the ports 60 of the double-acting valve member. The inner end of the plunger 79 is solid and is formed with a portion 82 of reduced diameter, which, in the neutral position of the valve overlaps the chambers 34 and 43 and part of the chamber 42. The ports 64 are normally aligned with the outlet chamber 44 and the ports 60 are disposed between the service chamber 35 and the discharge chamber 78.

To supply fluid to the motor, the valve plunger 79 is raised so that fluid may pass from the inlet chamber 42 through ports 64, passage 81, check valve 52, and ports 60 to chamber 35 and the service port 33. This elevation of the valve member closes the passage 83 between the chambers 42 and 43, thus closing the bypass. When the cylinder is to be exhausted, the valve member 79 is lowered in Fig. 3, providing an outlet passage from port 33 through chamber 35, ports 64, passage 81, the check valve 52, ports 60, and chamber 78 into the passage 36 which is connected to the return line. In this position, the passage 83 is open, and thus the pump bypass is open from the chamber 42 through outlet passage 46. Outlet chamber 44 and passage 47 are not effective in the single-acting valve, but may be retained to maintain uniformity of structure between the various forms of units.

In this valve unit, the discharge from a single-acting cylinder, which is not enforced by fluid delivered from the pump, and thus may not be capable of actuating succeeding motors in the series, is diverted from the series path and returned directly to the reservoir. However, fluid from the pump is available through the bypass to the succeeding valve sections when the single-acting cylinder is discharged.

The valve member 89 of unit C illustrated in Fig. 1 performs the same functions in the control of a single-acting cylinder as does member 79 illustrated in Fig. 3. The outer or cylinder-controlling end of the valve plunger 89 is alike in all essential respects to the outer end of the plunger 79 and operates in the same manner. The bypass is controlled, however, by a hollow plunger section rather than a reduced plunger section as in Fig. 3. The inner end of the plunger is formed with a longitudinal bore 91 provided with radial ports 92, 93 and 94. Ports 92 communicate with the inlet chamber 42 in the neutral or "hold" and the "exhaust" positions of the valve, ports 93 communicate with the outlet bypass chamber 43 in neutral position of the valve and ports 94 discharge into the passage 43 in the exhaust position of the valve member. Thus, the bypass is open in these two positions. When the valve member is raised to the supply position, the ports 92 are moved out of the chamber 42 and the bypass is closed.

Both types of single-acting valves shown in Figs. 1 and 3 are capable of throttling control of fluid for precise control of movement.

The valve section D may be called the outlet section since it incorporates not only a motor controlling valve 96, but also a low pressure manifold 97 (see Fig. 5). The body D is provided with a single plane face 99 adapted to abut the discharge surface of any of the other valve sections. The valve body D is provided with inlets 39 similar to the other valve sections, the inlets communicating with inlet chamber 42. The outlet or bypass chambers 43 and 44 discharge into the manifold 97 which extends further to merge into the chambers 37 and 36 at the ends of the valve body. As will be seen, any fluid seeping past the ends of the valve plungers, discharged from any cylinder, by-passed directly from the pump, or vented by the relief valve will reach the manifold 97 which is provided with a tapped discharge opening 98 which ordinarily is connected by appropriate pipe to a fluid reservoir.

The section D and the plunger 96 provide a form of control of a double-acting motor in which the motor floats in neutral position of the valve, that is, the fluid is not locked in the motor, both ends of the motor being connected to the fluid inlet and discharge passages so that it may float freely in either direction under the influence of the load. With respect to the valve mechanism in general, section D differs from section B in that the check valves are omitted from the valve plunger and that additional fluid connections are provided from the valve chamber to the service ports. No detailed description of the plunger 96 is required, because, except for the omission of the check valves, it is the same as plunger 29. Obviously, the seats for the check valves are not required, but it may be preferable to retain the seats as illustrated rather than manufacture and stock a distinct item. The non-functional recesses 71 of the valve bore 31 are only two in number, the two outermost ones. The two inner recesses 71 are replaced by recesses 101 which communicate with the service ports 32 and 33 by drilled passages 102 and 103 (Fig. 4). As illustrated, in order to maintain a uniform size of outlet fitting, the service ports are bored oversize to provide clearance for the drilling of the passages 102 and 103 and are then fitted with reducing sleeves 104 and 105.

The operation of the float valve is as follows: When in the neutral or "float" position illustrated, the fluid is bypassed from the inlet passage 42 to the manifold 97 through ports 63 and 61 and ports 62 and 64 and the interior of the valve plunger as previously described for section B. However, in this position, the service ports 32 and 33 communicate with the interior of the valve plunger through ports 59 and 60, and thus both ends of the cylinder or motor are in free fluid communication with both the fluid inlet and outlet of the valve assembly. In the "forward" and "reverse" positions of the valve, the paths of fluid flow are the same as in the previously described double-acting section. The action differs only in that there is no check valve to prevent return flow from the cylinder. The recesses 101 are out of registry with the plunger ports in the power positions of the valve.

Although the float section is shown as the last section in the series, it need not be the last or be incorporated with the outlet manifold. For example, the first section B may be converted into a float section by the elimination of the check valves in the plunger and the provision of passages 102 and 103. Likewise, if the passages 102 and 103 are not provided in the outlet section and the check valves are installed in the plunger, a valve with a hold position would be provided. Also, sections B and C could be transposed if desired. It will thus be seen that a great variety of combinations of valves may be derived from a small number of components: the inlet section which includes the relief valve, the intermediate type of section with two plane faces, and the outlet section. Either the intermediate or outlet sections may be converted from the basic double-acting valve with "hold" position to a single-acting valve or a float valve by minor modifications of the valve casing and the substitution of a slightly different plunger in one case or removal of the check valves in the other.

Ordinarily, it is believed preferable that the "float" position valve, if one is provided, be the last in the series because a full float is obtained with most cylinders only when there is zero back pressure. If the discharge from the float position valve proceeds to a subsequent valve which is connected to energize a loaded cylinder, back pressure would be present in the cylinder in float condition. As a result, if the effective areas of the two ends of the piston in the cylinder are different, there will be a force tending to move the piston in the cylinder.

Preferably, the sections A and D, which are the end sections of the assembly, are drilled at the corners as indicated at 106 for mounting bolts to support the assembly.

The manner in which the several sections are held in assembled relation is best shown in Fig. 5. The outlet section D is provided with six drilled and tapped holes 107 in its mating face which are aligned with holes 108 in the section C. These holes are counterbored at 109 to provide a seat for Allen head machine bolts 111 which are received in the tapped holes 107 to secure the blocks C and D together. The outer ends of the holes 108 are tapped out as indicated at 112 to receive centrally tapped studs 113 which are screwed into place after the bolts 111 are tightened. The central tapped openings of the studs 113 receive bolts 114 which secure section B to section C. Section B is drilled, counterbored and tapped in the same manner as section C and receives studs 116 on top of the bolts 114. The section A is drilled at 117 and counterbored for machine bolts 118 which fix the inlet section to the remainder of the assembly. Obviously, this arrangement may be utilized for as many or as few intermediate sections as are desired, and, since each two adjoining sections are firmly fixed to each other, the arrangement is far superior to conventional tie bolts extending the entire length of the assembly.

As previously stated, the relief valve 16 (Fig. 1) is mounted in the inlet section A. This section is bored through from end to end and a valve guide and seat member 121 is fitted into the bore 122 between the inlet chamber 11 and the relief chamber 12. The valve guide is grooved on its other surface to receive a setscrew 123 which retains it in place. The valve guide is formed with a central bore 124 with lateral openings 125 into the chamber 11. A movable relief valve plunger of a differential type comprises a body 126 which slides in the bore 124 and a head 127 which seals against the open end of the cup 121. The valve is normally held sealed by a compression spring 128 retained between the valve head and the spring follower 129 adjustably retained by a stud 130, locked in the usual manner by nuts 131 and 132. The adjusting screw 130 is mounted and the spring is guided in a spring retainer 133 threaded into the end of the valve body A. The movable valve member is provided with a central passage 136 so that the inner end is vented to chamber 12. The bore 124 is stepped so that the effective area of the valve seat 127 is slightly greater than that of the body 126, so that the valve has a differential action and a spring of only moderate strength is required. The passage 141 between the chambers 11 and 13 and the external opening 142 of the chamber 13 are closed by plugs 143 and 144 respectively which may be removed to drive the valve cup from the seat. By a mere reversal of the machining operation, the relief valve can be installed between chambers 11 and 13.

While the principles of the invention are illustrated in connection wth sectional valves, which have many advantages, particularly in that various numbers of valve units may be assembled as desired, the invention could be incorporated in valves in which a plurality of valve members are incorporated in a single unitary valve block or casting. In this case, the valve block could be cast for the desired number of units and cored in the same manner for all types of valves described herein. This coring would be for the basic double-acting unit with "hold" position (unit B). Any of these units could be modified to provide a single-acting unit or a "float" position unit in the manner described above.

Although it seems that the operation of multiple valves according to the invention will be clear to those skilled in the art from the foregoing description of the construction and operation of the various types of sections of which multiple valves are composed, it may be desirable to discuss briefly the operation of a multiple valve considering, by way of example, the combination of Fig. 1 in which the sections in order are: The inlet and relief valve section A; a double-acting hold position section B; a single-acting section C; and a double-acting float position section D.

Referring to Fig. 1, with all the valves in neutral position as shown, fluid enters the port 14, passes through chamber 11 and then through the inlet ports 39, chamber 42, the hollow plunger and the outlet passage 46 or passages 46 and 47 of each of the valve units B, C, and D in series into the outlet manifold 97. There is, thus, a free and open passage for flow of fluid through the multiple valve and the pump discharge is bypassed. Fluid is held in the cylinders controlled by the valves B and C and the cylinder controlled by the valve D is in a float position in which it may move freely in either direction.

Any one of the three valves may be actuated from its neutral position to operate its controlled cylinder in either direction. When the valve B is so actuated, incoming fluid from the pump is diverted into the cylinder and fluid exhausted from the cylinder reenters the through passage at 46 or 47. If the other valves are in neutral position the fluid passes freely to the outlet manifold. Since the fluid exhausted from the valve B is positively displaced from the cylinder or motor, it may be employed to actuate either of the cylinders controlled by the succeeding valves by shifting either of these valves from neutral.

The action of the valve units C and D and the cylinders controlled thereby are the same regardless of the setting of the valve B, since in any position of the valve B fluid under pressure is supplied to valve C. Of course, if the cylinder controlled by valve B is in operation, the pressure of the discharged fluid is modified in accordance with the force exerted by that cylinder.

From the standpoint of the overall valve system the operation of the single-acting unit C differs from that of unit B in that, when the single-acting cylinder is exhausted, the fluid discharged from the cylinder is diverted into the passage 36 and thus flows freely to the exhaust manifold regardless of the setting of the valve D. However, in this position of valve C, the bypass from the inlet passage of unit C to the outlet passage 46 is open, so that fluid under pressure is still supplied to valve unit D. When the unit C is supplying the single-acting cylinder the flow from the pump is all directed into this cylinder, and there is no supply to succeeding valves in the series, unless a throttling control is employed in which the sliding valve member 89 of the unit C is moved only partially to the "raise" portion.

The valve unit D is the last of the series, as illustrated in Fig. 1, which is desirable because, with the float control cylinder the last in the series, there can be no reaction on this cylinder in the "float" position because of back pressure from cylinders farther along in the series. Of course, if the two ends of the cylinder controlled by the valve D are of equal effective area, or if the effect of back pressure on the cylinder may be tolerated, the float position valve need not be the last of a series. This valve unit can be employed to supply succeeding cylinders in the same manner as valve unit B. This is true because in both the float position and the operating positions of the valve fluid is available at the outlet of D under pressure, whether it is bypassed directly through the unit or is discharged under pressure from the cylinder controlled by the unit.

As stated, the particular arrangement of the valve units illustrated in Fig. 1 is exemplary of various combinations of any number of units of any one or more of the types shown, which combinations can be made to satisfy different service requirements. In general, it is preferable to arrange the double-acting hold position valves, if any are present, first in the sequence, because these valves always discharge fluid under pressure. The same is true of the float position valves, but, in some cases, to secure a completely free float condition, these should be last in a series. Also, it is desirable to put the single-acting valves at the end of the series because, in the raise operation of the single-acting cylinder, there is no supply of fluid under pressure to the succeeding valves in the series.

However, except for the case in which a single-acting valve is in some position other than the last valve in a series, all cylinders may be operated simultaneously in either direction under full control.

It will be understood, of course, that for such simultaneous operation the pressure available in the system must exceed the sum of the pressure requirements of the cylinders. This may be regarded as a disadvantage in comparison to parallel circuit arrangements in which the pressure need only be sufficient to actuate the individual cylinder which carries the heaviest load. However, with series operation a smaller quantity of fluid is required, and this compensates for the greater pressure requirement. In addition, the series circuit permits positive simultaneous operation of two or more cylinders without the necessity for throttling control of the less heavily loaded cylinders to force fluid into the more heavily loaded cylinders.

The single-acting valve of the invention, with a through passage for pressure fluid in both neutral and exhaust positions and a separate return conduit for fluid exhausted from the cylinder, makes possible the use of a number of single-acting valves in a series or the provision of double-acting valves subsequent in the series to one or more single-acting valves. If the single-acting valve exhausted into the passage 46 or 47, the exhaust fluid from the single-acting cylinder might be incapable of actuating cylinders later in the series, since the fluid is not forced by the positive pump pressure as it is in the case of the exhaust from a double-acting cylinder.

Many modifications of structure may be made within the scope of the invention, which is defined by the appended claims and is not to be regarded as restricted or limited by the description herein of the preferred embodiment of the invention.

We claim:

1. A multiple control valve comprising a plurality of units in concatenated relation, each unit comprising a body with a valve bore therein and a plunger reciprocable in the bore from a neutral position to first and second operating positions on opposite sides of the neutral position, each body defining a service chamber, an inlet conduit, and an outlet conduit, all intersecting the bore, the inlet and outlet conduits of the successive units defining a through passage interrupted at the valve bores; the plunger having a central passage with ports extending therefrom at three longitudianlly spaced points, the first and second ports registering with the inlet and outlet conduits and the third port being closed by the bore in neutral position, the first and second ports being displaced from the outlet conduit and at least one of said ports registering with the inlet conduit in the first operating position, the third port registering with the service chamber in the first operating position, and the first and second ports registering with the outlet conduit and service chamber in the second operating position.

2. A control valve unit comprising a body with a valve bore therein and a plunger reciprocable in the bore from a neutral position to first and second operating positions on opposite sides of the neutral position, the body defining two service chambers, an inlet conduit, and an outlet conduit, all intersecting the bore, the inlet and outlet conduits of the unit defining a through passage interrupted at the valve bore; the plunger having two central passages with ports extending from each at three longitudinally spaced points, the first and second ports registering with the inlet and outlet conduits and the third port being closed by the bore in neutral position, the first and second ports being displaced from the outlet conduit and at least one of said ports registering with the inlet conduit in the first operating position, the third port registering with the service chamber in the first operating position, and the first and second ports registering with the outlet conduit and service chamber in the second operating position.

3. A multiple valve for controlling a plurality of motors, the valve comprising a valve unit for each controlled motor, the units constituting a valve block with a through passage for flow of fluid from a source of fluid under pressure to a low-pressure discharge; at least two of said units having two motor ports; a movable valve member in each unit intersecting the through passage for interconnecting respective motor ports thereof with the sections of the through passage on either side of the valve member; the valve member in each unit which has two motor ports having three positions, in two of which the through passage is interrupted and connected with the motor ports in alternative order, and in the third of which the through passage is open through the valve unit; one of said two motor port units having port means serving to connect both motor ports with the through passage when the through passage is open.

4. A multiple valve for controlling a plurality of motors, the valve comprising a valve unit for each controlled motor, the units constituting a valve block with a through passage for flow of fluid from a source of fluid under pressure to a low-pressure discharge; each unit having at least one motor port and at least one unit having two motor ports; a movable valve member in each unit intersecting the through passage for interconnecting the motor ports with the through passage; the valve member in each two motor port unit having three positions, in two of which the through passage is interrupted to form an entrance and an exit connected to the motor ports in alternative order, and in the third of which the through passage is open through the valve unit; the valve member in each unit with one motor port having three positions, in two of which the through passage is open and in the third of which the through passage is closed and the inflow section thereof is connected with the motor port.

5. A multiple valve for controlling a plurality of motors, the valve comprising a valve unit for each controlled motor, the units constituting a valve block with a through passage for flow of fluid from a source of fluid under pressure to a low-pressure discharge unit having at least one motor port and at least one unit having two motor ports; a movable valve member in each unit intersecting the through passage for inter-connecting the motor ports and the through passage; the valve member in each unit with two motor ports having three positions, in two of which the through passage is interrupted to form an entrance and an exit and connected to the motor ports in alternative order, and in one of which the through passage is open through the valve unit, and comprising two check valves in the valve member through which fluid is supplied to the motor ports; the valve member in each unit with one motor port having three positions, in two of which the through passage is open and in one of which the through passage is closed and the inflow section thereof is connected to the motor port, and comprising a check valve in the valve member through which fluid is supplied to the motor port.

6. A multiple valve for controlling a plurality of motors, the valve comprising a valve unit for each controlled motor, the units constituting a valve block with a through passage for flow of fluid from a source of fluid under pressure to a low-pressure discharge; each unit having at least one motor port and at least one unit having two motor ports; a movable valve member in each unit intersecting the through passage for interconnecting the motor ports and the sections of the through passage on either side of the valve member; the valve member in each unit with two motor ports having three positions, in two of which the through passage is interrupted and connected to the motor ports in alternative order, and in one of which the through passage is open through the valve unit; the valve member in each unit with one motor port having three positions, in one of which the through passage is open and the motor port is closed, in one of which the through passage is closed and the inflow section thereof is connected to the motor port, and in one of which the through passage is closed and the motor port is connected to a low-pressure discharge separate from the said through passage.

7. A control valve unit comprising a body with a bore therethrough and a valve member slidable in the bore from a neutral position to either of two operating positions, the bore being formed with enlargements providing fluid chambers, the chambers comprising in order longitudinally of the bore a service chamber, an outlet chamber, an inlet chamber, an outlet chamber, and a service chamber, the body having two faces formed for assembly to similar valve units and passages connecting the inlet and outlet chambers, respectively, to similarly-located openings on the said faces, respectively, and service ports connected to the service chambers; the valve member being formed with two longitudinal passages and with radial passages from each longitudinal passage communicating in the neutral position of the valve with the inlet chamber and an outlet chamber and with a radial passage from each longitudinal passage communicating with a service chamber when the valve is in neutral position and when it is shifted to one of the operating positions, one of the two first-mentioned radial passages communicating with the inlet chamber in the said one of the operating positions, the two first-mentioned radial passages communicating with the said service and outlet chambers in the other said operating position.

8. A control valve unit comprising a body with a bore therethrough and a valve member slidable in the bore from a neutral position to either of two operating positions, the bore being formed with enlargements providing fluid chambers, the chambers comprising in order longitudinally of the bore auxiliary chamber means, a service chamber, an outlet chamber, an inlet chamber, an outlet chamber, a service chamber, and auxiliary chamber means, the body having two faces formed for assembly to similar valve units and passages connecting the inlet and outlet chambers, respectively, to similarly-located openings on the said faces, respectively, and service ports connected to the service chambers; the valve member being formed with two longitudinal passages and with radial passages from each longitudinal passage communicating in the neutral position of the valve with the inlet and an outlet chamber, one of the two first-mentioned radial passages communicating with the inlet chamber in the said one of the operating positions, the two first-mentioned radial passages communicating with the said service and outlet chambers in the other said operating position, and the valve member being formed and with a radial passage from each longitudinal passage communicating with a service chamber when the valve is shifted to one of the operating positions and with the auxiliary chamber means in each of the other two positions.

9. A control valve unit comprising a body with a bore therethrough and a valve member slidable in the bore from a neutral position to either of two operating positions, the bore being formed with enlargements providing fluid chambers, the chambers comprising in order longitudinally of the bore an outlet chamber, an inlet chamber, an outlet chamber, a service chamber, and a return chamber, the body having two faces formed for assembly to similar valve units and passages connecting the inlet and outlet chambers, respectively, to similarly-located openings on the said faces, respectively, and service ports connected to the service chambers; the valve member being formed with a first longitudinal passage communicating in the neutral position and one operating position of the valve with the inlet and an outlet chamber and with a second longitudinal passage and with radial passages therefrom communicating with the service chamber and the return chamber when the valve is shifted to the said one of the operating positions, the radial passages communicating with the inlet chamber and the service chamber in the other operating position.

10. A control valve unit comprising a body with a bore therethrough and a valve member slidable in the bore from a neutral position to either of two operating positions, the bore being formed with enlargements providing fluid chambers, the chambers comprising in order longitudinally of the bore two auxiliary chambers, a service chamber, an outlet chamber, an inlet chamber, an outlet chamber, a service chamber, and two auxiliary chambers, the body having a fluid inlet connected to the inlet chamber, a fluid outlet connected to the outlet chambers, and service ports for connection to a motor communicating with the service chambers.

11. A control valve unit comprising a body with a bore therethrough and a valve member slidable in the bore from a neutral position to either of two operating positions, the bore being formed with enlargements providing fluid chambers, the chambers comprising in order longitudinally of the bore a service chamber, an outlet chamber, an inlet chamber, an outlet chamber, and a service chamber, the body having two faces formed for assembly to similar valve units and passages connecting the inlet and outlet chambers, respectively, to similarly-located openings on the said faces, respectively, and service ports connected to the service chambers; the valve member being formed with two longitudinal passages and with radial passages from each longitudinal passage communicating in the neutral position of the valve with the inlet and an outlet chamber and with a radial passage from each longitudinal passage communicating with a service chamber when the valve is shifted to one of the operating positions, one of the two first-mentioned radial passages communicating with the inlet chamber in the said one of the operating positions, the two first-mentioned radial passages communicating with the said service and outlet chambers in the other said operating position.

12. A control valve unit comprising a body with a valve bore therein and a plunger reciprocable in the bore from a neutral position to first and second operating positions on opposite sides of the neutral position, the body defining two service chambers, an inlet conduit, and an outlet conduit, all intersecting the bore, the inlet and outlet conduits of the unit defining a through passage interrupted at the valve bore; the plunger having two central passages with ports extending from each at three longitudinally spaced points, the first and second ports registering with the inlet and outlet conduits and the third port registering with the service port in neutral position, the first and second ports being displaced from the outlet conduit and at least one of said ports registering with the inlet conduit in the first operating position, the third port registering with the service chamber in the first operating position, and the first and second ports registering with the outlet conduit and service chamber in the second operating position.

13. A multiple control valve comprising a plurality of units in series relation, each unit comprising a body with a valve bore therein and a plunger reciprocable in the bore from a neutral position to first and second operating positions on opposite sides of the neutral position, each body defining a service chamber, an inlet conduit and an outlet conduit all intersecting the bore, the inlet and outlet conduits of the successive units defining a through passage interrupted at the valve bores; the plunger having a central passage with ports extending therefrom at three longitudinally spaced points, the first and second ports registering with the inlet and outlet conduits and the third port being closed by the bore in neutral position, the first and second ports being displaced from the outlet conduit and at least one of said ports registering with the inlet conduit in the first operating position, the third port registering with the service chamber in the first operating position, and the first and second ports registering with the outlet conduit and service chamber in the second operating position; and a check valve in the central passage disposed to block flow from the third port to the other ports.

14. A multiple valve for controlling flow of hydraulic fluid to and from a plurality of motors comprising in combination a plurality of valve units providing a path for series flow of fluid through the units from a source to a low pressure receiver, at least one valve unit being double-acting and adapted to control a double acting motor and at least one unit being single-acting and adapted to control a single-acting motor, each unit being constructed to divert fluid from said series path to the motor it controls, the double-acting unit being constructed to direct exhaust fluid from its motor into said path for re-use in following units and the single-acting unit being constructed to direct exhaust fluid directly from the single-acting motor to the receiver while maintaining said series path open to thereby allow either single or simultaneous operation of the motors controlled by units both ahead of and in back of said single-acting unit when its motor is being exhausted and allow exhausting of the single-acting motor regardless of operating conditions in the valve units ahead of or in back of said single-acting units.

15. A multiple valve for controlling flow of hydraulic fluid to and from a plurality of motors comprising in combination a plurality of valve units providing a path for flow of fluid through the units in series from a source to a low-pressure receiver, at least one of the valves being a double-acting valve adapted to control a double-acting motor and at least one valve being a single-acting valve adapted to control a single-acting motor; the units being constructed to divert fluid from the said path into the motors controlled thereby; the double-acting valves being constructed to direct fluid returning from the motors controlled thereby into the said path and thereby into succeeding valves of the series through the said path; and the single-acting valves being constructed to direct fluid returning from the motors controlled thereby into a conduit separate from the said path and discharging into the said receiver.

16. A multiple valve of the open center series connected type comprising a plurality of valve units assembled side by side and affording a path for fluid flow from a source of fluid under pressure to a low pressure receiver, one of said units being a double-acting valve and serving to control a double-acting motor, and the next succeeding unit being a single acting valve and controlling a single acting motor, the double-acting unit having active positions in which it receives fluid from said path and diverts it to the double-acting motor controlled thereby and simultaneously receives exhaust fluid from that motor and delivers it to said path, and so to the single acting unit, said single acting unit having an auxiliary exhaust through which it may discharge fluid returning from its motor.

ROBERT F. HODGSON.
WILLIAM C. DOLCH.

References Cited in the file of this patent

UNITED STATES PATENTS

| Number | Name | Date |
| --- | --- | --- |
| 2,247,140 | Twyman | June 24, 1941 |
| 2,289,567 | Berglund | July 14, 1942 |
| 2,362,944 | Stephens | Nov. 14, 1944 |